S. L. BRADLEY.
METAL SHEARS.
APPLICATION FILED NOV. 14, 1908.

950,039.

Patented Feb. 22, 1910.
3 SHEETS—SHEET 1.

Inventor
S. L. Bradley.

Witnesses

By

Attorney

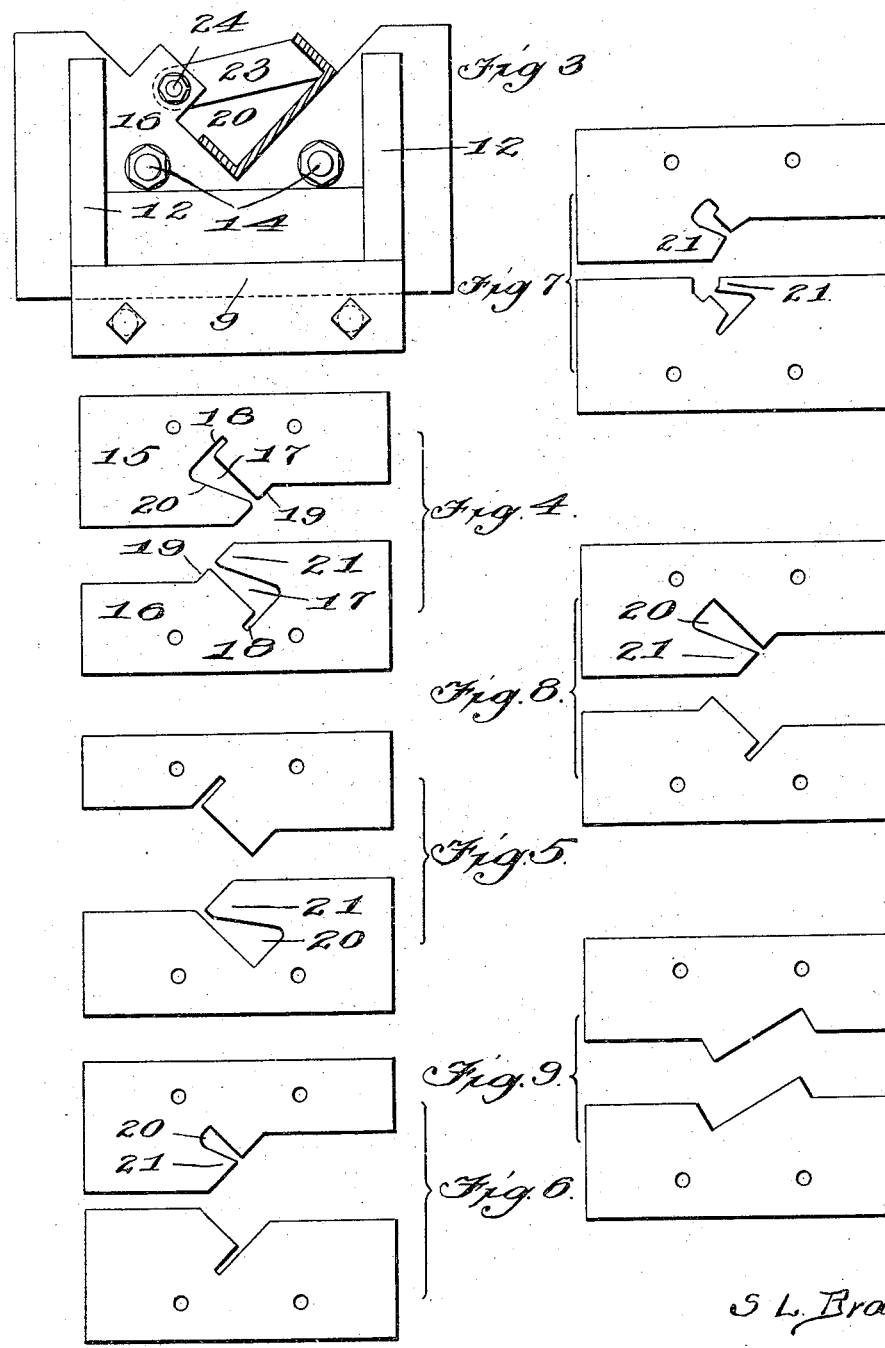

S. L. BRADLEY.
METAL SHEARS.
APPLICATION FILED NOV. 14, 1908.
950,039.
Patented Feb. 22, 1910.
3 SHEETS—SHEET 3.
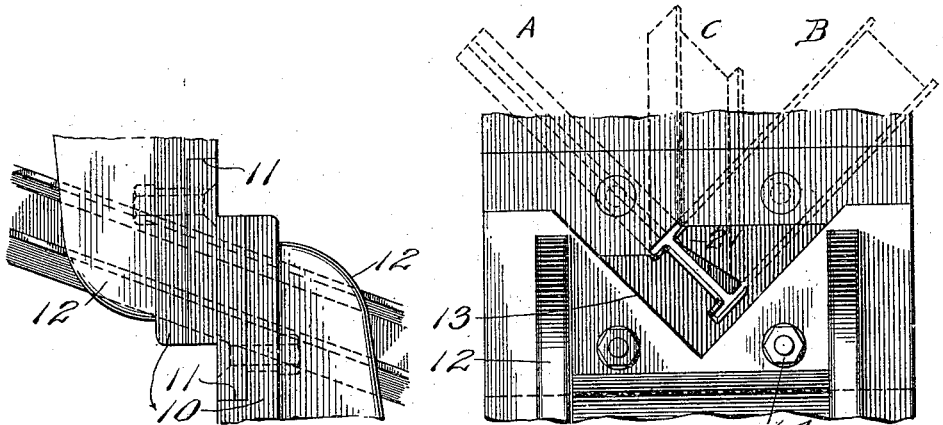
Fig. 10.  Fig. 11.
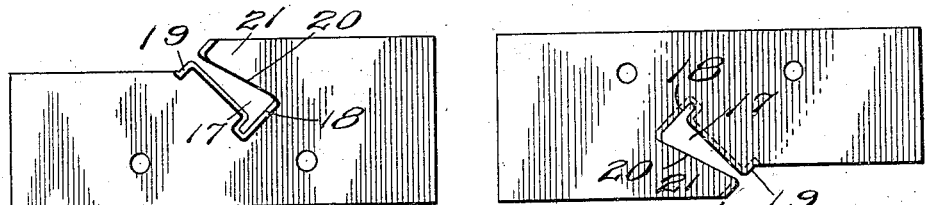
Fig. 12.
Fig. 14.  Fig. 13.  Fig. 15.
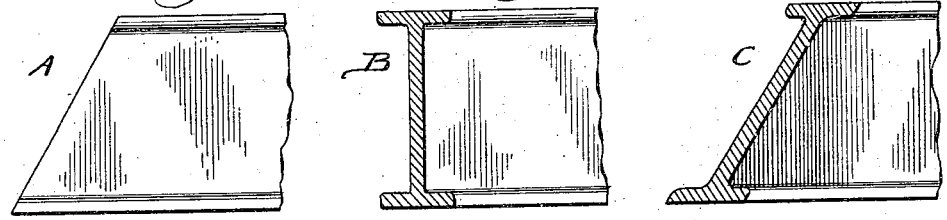
Fig. 16.
Inventor
S. L. Bradley.
Witnesses
By
Attorney

UNITED STATES PATENT OFFICE.

STEPHEN L. BRADLEY, OF SANDWICH, MASSACHUSETTS.

METAL-SHEARS.

950,039.  Specification of Letters Patent.  Patented Feb. 22, 1910.

Application filed November 14, 1908. Serial No. 462,656.

*To all whom it may concern:*

Be it known that I, STEPHEN L. BRADLEY, citizen of the United States, residing at Sandwich, in the county of Barnstable and State of Massachusetts, have invented certain new and useful Improvements in Metal-Shears, of which the following is a specification.

This invention relates to shearing machines for metal shapes, particularly for cutting structural metal shapes and beams as well as bars and railroad rails.

The object of the invention is to provide improved blades for shearing such shapes without marring or distorting the flanges thereof. With some shear blades now in use the defect exists that in cutting flanged metal the cut is not clean, the flanges being bent or otherwise distorted. By the means herein described this defect is avoided, and a clean cut is produced. Furthermore, most shears now in use waste a strip of each metal bar or shape, whereas the shears herein disclosed waste none whatever. And these shears do not mar or distort either end of the metal cut, the piece cut off being clean and true, as is also the piece left. Thus many pieces can be cut from a beam in succession and both edges or end of each piece are always clean and true.

The invention is illustrated in the accompanying drawings in which—

Figure 1:
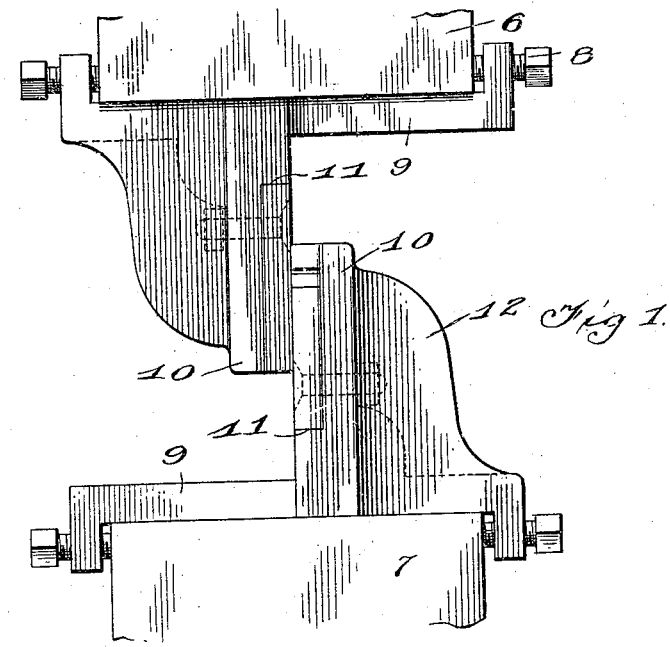
Figure 2:
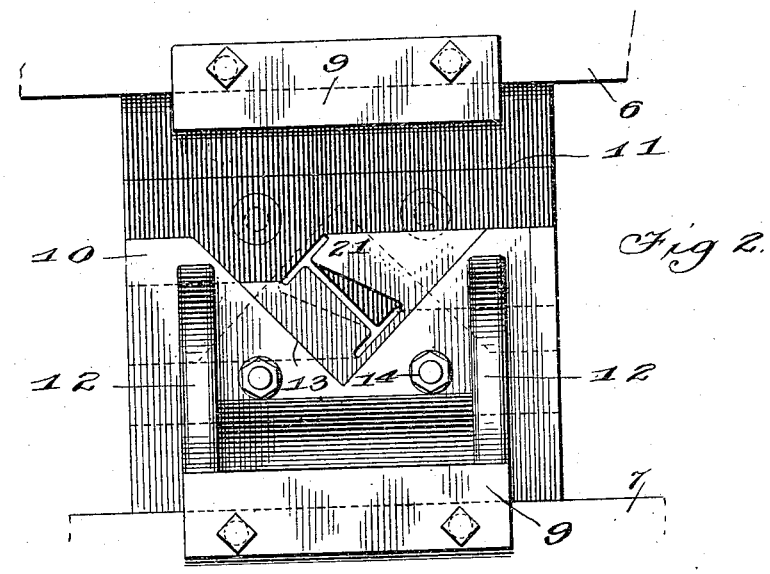

Figure 1 is a side view of the shear blades and part of the shearing machine; Fig. 2 is an end view; these views show the blades closed, and applied to an I-beam. Fig. 3 is an end view showing the bottom blade of a modified form, for cutting channel bars; Figs. 4, 5, 6, 7, 8 and 9 are face views of pairs of blades for cutting various shapes, Fig. 4 being the blades for cutting various shapes, Fig. 5 being the blades for an I-beam, as in Figs. 1 and 2, Fig. 5 for a channel beam, Fig. 6 for a T-beam, Fig. 7 for a railroad rail, Fig. 8 for a modified I-beam, and Fig. 9 for a Z-beam. Figs. 10 and 11 are side and front elevations of shears for bevel cutting, showing beams in dotted lines; Fig. 12 is a face view of a pair of blades for bevel cutting; Figs. 13, 14 and 15 are side elevations of three types of bevel-cutting beams; Fig. 16 is a detail in section of blades for bevel-cutting.

Referring specifically to the drawings, the top or upper stock is indicated at 6, and the bottom stock at 7, one of which, usually the upper, is movable toward and from the other. However, both can be moved simultaneously if desired. The blade holders are attached to the stocks in any suitable manner, as by bolts 8, the upper blade holder being indicated at 9 and the lower blade holder at 10, and both holders may be of the same form and construction, comprising, as shown, a vertical plate 10 recessed to receive the blade which rests against a shoulder 11, and strengthened by ribs 12 on the back, these parts being formed integral with the base part marked 9 which rests upon the stock. The vertical part 10 has a deep notch or V 13 produced therein, to expose the blade and afford clearance for the beam or shape being cut. The vertical part may be otherwise formed so as not to interfere with inserting the beams or bars in the shear blades. The blade is held in place by bolts 14 the heads of which are countersunk in the blades.

For cutting I-beams, the blades are provided as shown in Fig. 4, the upper blade in this and the other views being indicated at 15 and the lower blade at 16. In Fig. 4 these blades are the same shape, reversed to coöperate with each other. Each blade is recessed as at 17 to receive the web of the shape, and has an inner recess 18 to receive the inner flanges and an outer recess 19 to receive the outer flanges. The recess 17 is enlarged on one side, the edge of the blade being inclined off to the outer end of the flanged recess, as indicated at 20, the purpose of this being to allow clearance for the insertion of the beam when the blades are slightly lifted or retracted with respect to each other. This enlargement or recess appears in all the forms shown, except the blades shown in Fig. 9 for cutting the Z-beam, where it is unnecessary. The size of this recess may be increased or diminished as desired.

The outline or construction described and illustrated produces an overhanging shoulder or projection 21, which is an especial feature of this invention and will be found variously modified in the different blades illustrated. This shoulder has a cutting edge, and it rests under the outermost or projecting flange of the beam being cut. This is the flange which is usually distorted with ordinary shear blades, since it has nothing to support it, but by this invention a support is provided which prevents bending or distortion or ragged cutting of said flange, either on the part of the beam or bar cut off or the part remaining. It will also be observed that all the other flanges, as well as the webs of the various shapes are supported by or in contact with a solid shearing edge, so that a clean cut is produced across the whole section of the beam, both ends being cut clean and true, as above described. This is true not only of the lower blade, but of the upper blade, so that the same result is produced in both directions, which is highly advantageous in practical operation.

The shapes or beams to be cut are inserted endwise through the recesses in the blades, when the blades are lapped and slightly retracted to bring the enlarged recesses 20 into use. Then when the pressure is applied the blades move across each other and perform the shearing action.

In the modification shown in Fig. 3 the outer flange of the channel beam is supported by a removable shoulder or block 23, fastened to the main part of the blade by a bolt 24, and the end of this block coöperates with the upper blade to shear the outer flange. The projecting part 23 is equivalent to the projecting part 21 of the other forms, the latter, however, being made integral with the remainder of the blade. This figure shows an ordinary lower blade for cutting angle or V metal, the blade 23 and bolt 24 being merely added. Any of the other blades can be made of component parts, instead of one piece, provided the general contour of the cutting edges remains the same.

In Fig. 9 a simpler form is illustrated for cutting Z-beams, but it will be observed that both of the flanges of the Z-beams are supported or engaged by blades on both sides, in operation.

The constructions shown also may be applied to bevel-cutting, as shown in Figs. 10 to 16. Heretofore, so far as I know, this is now done by sawing, where mitered or beveled corners are necessary in steel building and other structural steel construction. The shears for this purpose will embody the same principle as in cutting at right angles, but the contour of the cutting edges of the blades will be made to fit the particular bar or shape when inserted at the desired angle of cutting, as shown particularly in Figs. 12 and 16.

For bevel-cutting an I-beam, for example, as shown in Fig. 12, the recess 17 will be longer, in order to accommodate the increased length of cross section of the web incident to the angle of cut; and similarly the recesses 18 and 19 must be wider, to accommodate the increased sectional area of the flanges of the beam; and the edges of the blades must be angular, as illustrated in Fig. 16. In other words, the area of the recesses in the blades must be enlarged according to the angle of cut desired, in order to give the proper clearance in the blades, to allow the plane of shear to correspond with the plane of the sectional cut desired. In Fig. 11 the beam is shown in dotted lines, inserted in three different ways, indicated at A, B and C respectively, to produce the cuts illustrated in Figs. 13, 14 and 15 respectively, the first being a bevel parallel to the web, the second being a bevel at a right angle to the web, and the third being an oblique bevel, or a combination of the other two. In the several cuts the support afforded the flanges of the beam permits a clean and sharp cut to be made at any angle desired, and therefore will be attended with the described advantages, as compared to the present method of sawing beveled ends.

I claim:

1. The combination of coöperating shear blades for cutting flanged metal shapes, each blade having inner and outer recesses to receive inner and outer flanges of the shapes, and a connecting recess to receive the body of the shapes, each of said blades having cutting edges along all of the recesses therein, whereby the body and all the flanges of the shapes are supported and sheared from both sides by said edges.

2. The combination of coöperating shear blades for cutting flanged metal shapes, each blade having recesses with cutting edges along the same, to receive the flanges and body of the shape, the body recess of at least one blade being enlarged laterally, substantially as and for the purpose described.

3. The combination of coöperating shear blades for cutting flanged metal shapes, each blade having recesses with cutting edges along the same, at least one blade having inner recess to receive an inner flange of the shape and a projecting shoulder or part extending over said inner recess and provided with a cutting edge at its extremity to support and shear an outer flange of the shape.

4. The combination of coöperating shear blades for bevel cutting flanged metal shapes, each blade having recesses to receive the web and flanges of the shape, with cutting edges along said recesses, the said edges being beveled at an angle corresponding to the angle of cut desired.

5. The combination of coöperating shear blades for bevel cutting flanged metal shapes, each blade having inner and outer recesses extending at an inclination across the blades, to receive inner and outer flanges of the shapes, and a connecting recess to receive the web of the shape, said recesses being enlarged according to the cross-sectional area of the shape at the plane of the cut, and having cutting edges along said recesses.

6. The combination of rectilineally movable shear blades for cutting flanged metal shapes, having recesses in their adjacent edges provided with cutting edges therealong and coöperating to receive and support the flanges and body of the shape while cutting the same, a portion of the recess of at least one blade being enlarged laterally, substantially as described.

In testimony whereof, I affix my signature in presence of two witnesses.

STEPHEN L. BRADLEY.

Witnesses:
ALBERT HOLNAY,
ALEX. R. BREBNER.